United States Patent [19]

Geil

[11] Patent Number: 5,003,285
[45] Date of Patent: Mar. 26, 1991

[54] TRANSDUCER ARRAY

[75] Inventor: Fred G. Geil, San Diego, Calif.

[73] Assignee: The United States of America as represented by the Secretary of the Navy, Washington, D.C.

[21] Appl. No.: 287,392

[22] Filed: Sep. 8, 1972

[51] Int. Cl.$^5$ ............................................. H04B 17/00
[52] U.S. Cl. .................................... 367/154; 367/155; 367/162; 367/166; 367/171; 367/172; 367/176
[58] Field of Search ...................... 340/7, 8, 9, 10, 12, 340/13, 15, 17; 367/153, 154, 155, 162, 166, 167, 171, 172, 176

[56] References Cited

U.S. PATENT DOCUMENTS

| 3,027,540 | 3/1962 | Howatt | 340/10 |
| 3,187,300 | 6/1965 | Brate | 340/10 |
| 3,277,436 | 10/1966 | Fitzgerald et al. | 340/10 |
| 3,286,227 | 11/1966 | Aldrich | 340/10 X |
| 3,364,461 | 1/1968 | Trott | 340/9 X |
| 3,437,171 | 4/1969 | Davis et al. | 340/10 X |
| 3,458,857 | 7/1969 | Hancks et al. | 340/10 |
| 3,495,210 | 2/1970 | Angeloff | 340/9 |

Primary Examiner—Harold J. Tudor
Attorney, Agent, or Firm—Harvey Fendelman; Thomas G. Keough; Ervin F. Johnston

[57] ABSTRACT

A transducer array designed for towing at an extended distance behind a surface vessel includes electroacoustical transducer elements connected in opposition to the active elements of the array. A surrounding acoustic isolation structure effectively isolates the dummy transducer elements from the ambient noise field while permitting cancellations of self-induced noise.

10 Claims, 1 Drawing Sheet

TRANSDUCER ARRAY

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of electroacoustic transducers. More particularly, the invention pertains to the field of electroacoustic transducers designed for use within an aqueous medium. By way of further characterization, this invention pertains to the field of electroacoustic transducers designed to be towed behind a vessel operating in or on the high seas. In still greater particularity, the invention pertains to the field of noise cancellation within a towed array of electroacoustic transducers.

DESCRIPTION OF THE PRIOR ART

Underwater electroacoustic transducers have long been used in the fields of oceanographic exploration and Naval Intelligence. In such applications, great emphasis is placed on obtaining a desired pattern of directivity of such electroacoustic transducers. It was soon recognized that a plurality of individual transducers spaced apart and electrically connected so as to form an array of electroacoustic elements could be arranged to give the desired pattern directivity. However, the increase in gain of the processed signal due to such array configurations was largely offset by the increased noise level detected by the array which was generated in the supporting ship.

In order to isolate and minimize the noise produced by the instrumentation ship, the array was physically isolated from the instrumentation ship. In the simplest arrangement, this isolation comprised towing the array at a considerable distance behind the instrumentation ship. In order to preserve the directivity gain produced by the array when being towed, large and complex mounting arrangements evolved which provided noise immunity for many modes and types of operation. However, such mounting arrangements suffered from the disadvantage of being physically large and quite expensive to fabricate as well as imposing certain hydrodynamic limitations on the instrumentation ship when the array was deployed.

In order to overcome the limitations of the large fixed array, it was theorized that equivalent results could be obtained by mounting the individual elements of the electroacoustic array in a flexible waterproof conduit which could be easily towed behind a surface vessel with a minimum of hydrodynamic drag and at a considerable savings of space and cost of fabrication. Early developmental models of such transducer arrays soon gave rise to other noise and electroacoustical distortion problems including axial acceleration modes and noise generated by bending and surface transmitted acoustical waves. The noise and distortion caused by the axial acceleration were solved by using suitable mounting techniques. However, such techniques provided little solution for the cancellation of the noises induced by bending and other modes of noise generation. In some installations, the entire waterproof conduit was fluid filled. Such fluid filling tends to minimize the noises caused by bending of the towed array, however, the problems of mechanical manufacture of the fluid filled conduit of the required dimensions and other mechanical problems imposed by this design limit the effectiveness of this constructional arrangement.

The foregoing discussion is not intended as an exhaustive analysis of the prior art, but merely an indication of the prior art constructions having a recognizable similarity in purpose to this invention. The design of electroacoustic transducers remains a somewhat empirical art and a great many ostensibly promising constructions have been proposed, tried, and abandoned. Most require complex combinations of mechanical or fluid coupling devices to an electromechanical element. These systems are fragile and difficult to make, install, and operate.

As a consequence of the above noted development of the art, the requirements for a low-cost, low-noise, mechanically simple, and inexpensive towed array have become apparent. It is to this long apparent need that the present invention addresses itself.

SUMMARY OF THE INVENTION

The present invention employs a plurality of identical electroacoustical transducers located, in pairs, along the length of a towed electrical conduit. The individual ones of each pair of electroacoustical transducers are connected in series opposition. One member of each pair, termed "dummy element," is acoustically isolated from the ambient acoustic field being investigated. The remaining one of each pair of electroacoustic transducers is permitted to intercept acoustic wave signals from the ambient water area. This arrangement causes cancellation of noises originating within the towed array and its associated structure while permitting effective measurement of acoustic energy in the surrounding water.

STATEMENT OF THE OBJECTS OF THE INVENTION

It is accordingly an object of this invention to provide an improved transducer array.

Another object of the present invention is to provide an improved transducer array which is adapted to be towed behind an instrumentation vessel.

Another object of this invention is to provide a transducer array having improved noise cancellation properties.

A further object of the present invention is to provide a linear transducer array which may be towed behind an instrumentation vessel with a minimum of self-induced noise.

A still further object of the present invention is to provide an electroacoustic transducer array in which each of the electroacoustic units is comprised of an active and a shielded dummy transducer element.

A still further object of the present invention is to provide an electroacoustic transducer array suitable for towing in an oceanographic environment behind an instrumentation vessel.

Yet another object of the present invention is to provide a low-cost, oceanographic electroacoustic transducer array.

Still another object of the present invention is the provision of an oceanographic electroacoustic transducer array which may be easily streamed and recovered by an instrumentation vessel.

A still further object of the present invention is to provide a towed, electroacoustic array having acoustic isolation means as a component part of the noise reduction system.

These and other objects of the invention will become more readily apparent from the ensuing specification when taken with the drawings.

DESCRIPTION OF THE PREFERRED EMBODIMENT

Figure 1:
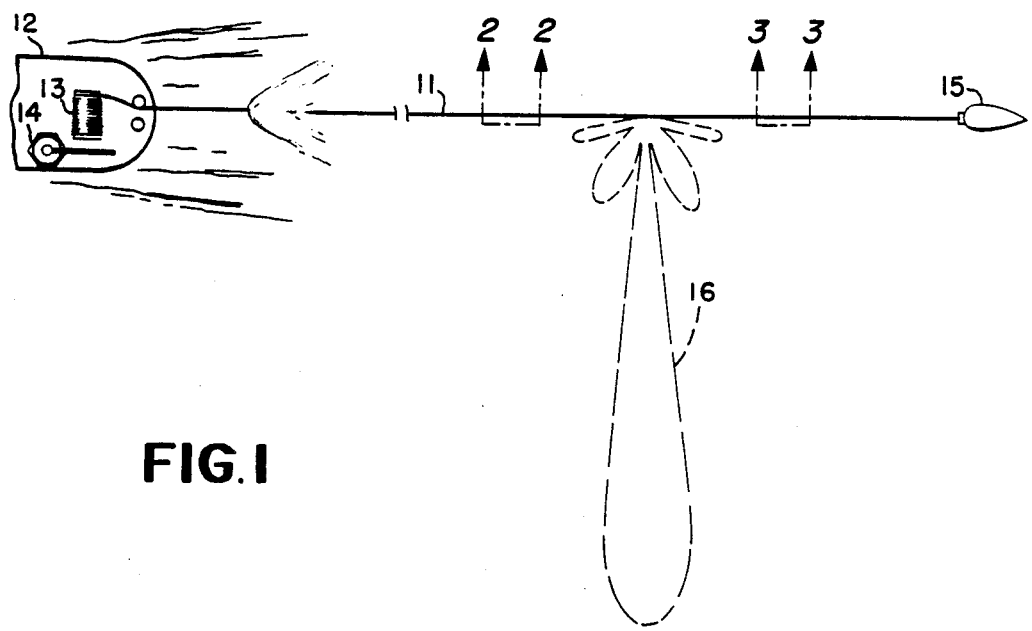
FIG. 1 is a plan view of the device of the invention being deployed.

Referring to FIG. 1, a plan view of the hydrophone array according to the invention, indicated generally at 11, is deployed from a suitable instrumentation vessel. In the illustrated embodiment, the instrumentation vessel is a surface vessel 12, however, other vessels may serve equally well as instrumentation platforms to utilize the improved hydrophone array of the invention. For example, the invention, with small, obvious modifications, may be employed by a submarine vessel or by a rotary wing aircraft. Such substitutions of conventional instrumentation platforms for surface vessel 12 would be obvious to those versed in the instrumentation and oceanographic arts.

As shown, hydrophone array 11 is a linear cable-like device which is attached at its bitter end to suitable cable handling equipment aboard surface vessel 12. For example, a large diameter winch 13 may be satisfactorily employed. Such winches are common in the instrumentation and mine sweeping arts and, therefore, are not further described herein. Likewise, a suitable shipboard crane 14 may be employed to assist in streaming and recovering the device of the invention and in launching and recovering a suitable drogue instrument package 15 which may, if desired, be attached to the distal end of hydrophone array 11.

Drogue instrument package 15 may be configured so as to position the distal end of hydrophone array 11 at a desired operational depth and at an angular displacement behind tow vessel 12, if desired. Also, it should be noted, that drogue package 15 may contain associated electronic components which cooperate with the hydrophone array 11 of the invention. Similarly, additional gear may be placed upon hydrophone array 11 at a point intermediate the distal end and surface vessel 12. Such gear serves the purpose of depressing the end of the active portion of transducer array 11 to place the array in a substantially horizontal attitude at the desired operational depth. Such devices are well understood in the oceanographic instrumentation art and therefore are not further described herein since its operation is not necessary to the understanding of the invention.

Transducer array 11 comprises a plurality of identical transducer elements spaced at predetermined intervals along its length. The individual elements are made of conventional piezoelectric ceramic material, such as lead zirconate or barium titanate. In the illustrated embodiment they are configured as resonant cylindrical assemblies. The number, spacing, and physical dimensions of the individual transducer elements spaced therealong determine the directivity pattern of the array. That is, the spacing and dimensions of individual transducers may be varied to obtain a desired sensitivity or radiation pattern. Such a pattern is indicated at FIG. 1 by the broken-line pattern 16. It should be understood that pattern 16 is exemplary only and a variety of shapes and angular configurations are obtainable by following conventional transducer design practice.

Generally, for reasons of cost effectiveness and manufacturing convenience, the individual hydrophones or transducers forming transducer array 11 are of a similar construction. However, for convenience of illustration and for purposes of explanation, transducer array 11 shown in FIG. 1 is illustrated as being comprised of transducer units which employ different construction techniques.

Figure 2:
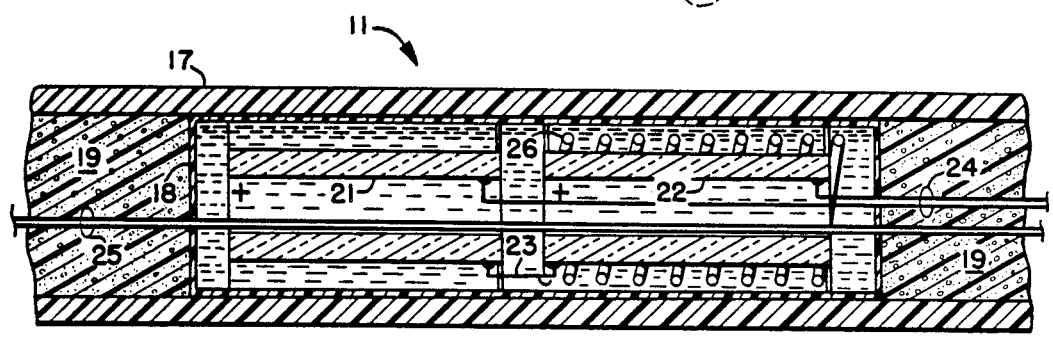
FIG. 2 is a sectional view of a portion of the transducer array of the invention taken along lines 2—2 of FIG. 1.

Referring to FIG. 2, a sectional view of transducer array 11 is shown. It may be seen that transducer array 11 comprises an outer sheath 17 and suitable fluid filled cells 18 spaced at intervals along the length of transducer array 11 and within outer sheath 17. Of course, outer sheath 17 is made of a material which is impervious to the water or other fluid medium in which the array 11 is deployed. Additionally, sheath 17 is made of a material which is acoustically transparent. A plurality of such materials including plastics and natural rubber are known in the prior art. Outer sheath 17 is filled in the intervals between fluid filled cells 18 by a suitable dielectric material 19. Dielectric material 19 may be acoustically opaque and may have a specific gravity such as to render transducer array 11 neutrally buoyant. Quite obviously, if other than neutral buoyancy is desired for array 11, dielectric material 19 may be varied accordingly to give the desired degree of positive or negative buoyancy in dependence on the application for which transducer array 11 was designed.

As shown, a pair of cylindrical ceramic electroacoustic transducers, indicated at 21 and 22, are coaxially mounted within fluid filled cell 18. Cylindrical electroacoustic transducers are well known in the prior art and customarily have electrodes on their outer and inner surfaces. As shown, transducers 21 and 22 are connected in series opposition by means of a jumper 23 and an output cable 24. Jumper 23 connects the outer electrodes of transducer 21 to that of 22 while output cable 24 is connected to the inner electrode, designated as positive, of each of the transducers. However, if desired, an opposition parallel arrangement may be employed.

As previously noted, a plurality of fluid filled cells 18 are spaced at predetermined intervals along transducer array 11 and each such transducer is connected to the instrumentation vessel by means of similar cables to cable 24. One such cable is indicated, for purposes of illustration, at 25. It will be observed that cable 25 passes through the annular center of transducer elements 21 and 22. This placement of cable 25 is preferred inasmuch as it causes a minimum of acoustic shading when so located. Of course, if desired for purposes of simplicity of manufacture, cable 25 may be routed around fluid filled cell 18 and, in such instances, would produce a small amount of acoustical shading between the transducer 21 and the ambient water surrounding outer sheath 17.

In the illustrated example, transducer element 22 is surrounded by a length of spiral wound wire or spring 26. Although the term "spring 26" is used to describe the length of spiral wound wire, it is not necessary that the structure posses longitudinal resilancy. Spring 26 is relatively incompressible in its lateral dimensions and thereby shields electroacoustic transducer 22 from compressional wave energy which would impinge outer sheath 17 in the region occupied by transducer element 22. As will be apparent, the amount of acoustic shielding afforded by spring 26 is dependent to a predictable extent upon the pitch or compression of the spring windings. In the illustrated embodiment, the pitch of spring 26 and the space between winding is exaggerated for convenience of illustration and explanation. However, in actual examples, the pitch of spring 26 may be varied to provide the desired degree of shielding. In most instances the individual windings of spring 26 are in mutual contact so as to form an uninterrupted sleeve thereabout. If desired, a metallic sleeve may be used in the device of the invention in place of spring 26 at some sacrifice of flexibility.

Figure 3:
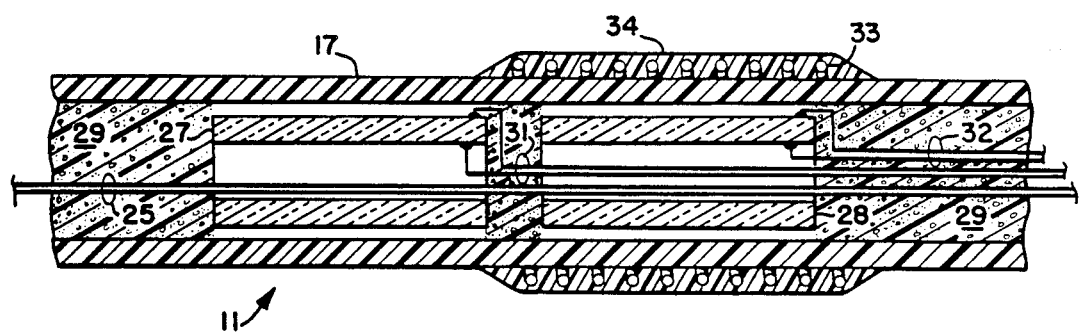
FIG. 3 is a sectional view of a portion of the transducer array according to the invention taken along lines 3—3 of FIG. 1.

Referring to FIG. 3 a second variation of the transducer arrangement according to the invention is illustrated. Like the arrangement in FIG. 2, cylindrical transducers 27 and 28 are coaxially aligned and held within outer sheath 17 by means of suitable mountings, not shown. The space between transducer elements within outer sheath 17 is occupied by a suitable dielectric filling 29. In this arrangement, it will be noted, that transducer elements 27 and 28 are not enclosed in a fluid cell as in the arrangement of FIG. 2. Because of this disposition, dielectric material 29 must be chosen from those materials which are acoustically transparent or, alternatively, a mounting arrangement such as to prevent dielectric material 29 from coming between transducer 27 and outer sheath 17 must be employed.

Transducer elements 27 and 28 each have separate output cables, indicated at 31 and 32 respectively. This arrangement permits the outputs of transducer elements 27 and 28 to be combined at the utilization device rather than at the transducer itself. This system has certain advantages as will be explained later. Also, as in the embodiment shown in FIG. 2, an output cable 25 from adjacent units passes through the axial void of transducer elements 27 and 28.

On the outside of outer sheath 17 a spring 33 encircles the area occupied by transducer element 28. Spring 33 may be constructed in the same manner as spring 26, previously described, and may be held in place on outer sheath 17 by means of a suitable binder material 34. Binder 34 may be a synthetic plastic or resin material which is applied to secure spring 33 in place after initial testing indicates its optimum placing with respect to transducer element 28. It should be noted that binder 34 may advantageously be acoustically opaque. It will be observed that binder 34 is tapered to the outer sheath 17 such as to provide a minimum hydrodynamic disturbance in the vicinity of spring 33 and to facilitate winding of transducer array 11 about winch 13. Likewise, it should be noted that spring 33 may be of a considerable smaller scale than that shown in FIG. 3 and likewise binder 34 may have less axial extent to provide minimal hydrodynamic disturbance.

It should be noted that in both FIG. 2 and FIG. 3 certain mechanical details such as mounting and spacing hardware for the transducer elements and electrical wiring have been intentionally omitted for reasons of illustration clarity. The construction of each of the cells follows the current standards of construction commonly employed in the electroacoustic arts and is not dependent upon any specific mounting or hardware arrangement for successful operation. Choice as to the specific arrangement used is, therefore, left to the proficient artisans.

MODE OF OPERATION

The operation of the transducer array according to the invention depends on the fact that self-noise voltages from each element in a normal noncancelling type array is coherent at the lower frequencies. Thus, voltages generated by each of the transducers in a pair will be of essentially equal magnitude but opposite in phase. Therefore, the noise transmitted along array 11 will impinge both transducers in the paired arrangement and will be cancelled. This is particularly true of the lower frequencies which predominate in towed array arrangements because of the minimal effect of acoustic loading that spring 26 has at these frequencies.

Thus, it may be seen that in each paired arrangement of an active transducer element and an electrically identical dummy transducer element the low frequency noises arising from the cable-like array 11 moving through the water are cancelled. However, the active crystal of each pair is exposed to compressional wave energies in the propagating medium in which transducer array 11 is immersed while the surrounding spring protects and shields the dummy element from this impinging energy. As a result, the desired signal being investigated is not cancelled and has an increased relative magnitude to the noise signal when compared with conventional towed arrays.

As previously noted, transducer array 11 ordinarily has individual transducer elements thereof of the same type. That is, either the arrangement of FIG. 2 or the arrangement of FIG. 3 is employed throughout the length of transducer array 11. The choice between the two transducer element arrangements is dependent upon the specific application for which the device is designed. In this regard, it should be noted that the construction of FIG. 2 employing fluid filled cells is preferable where frequent or excessive flexures and bending of array 11 are likely to occur. The arrangement of FIG. 3, on the other hand, is to be preferred where such mechanical flexures and bending are less likely to occur and where noise cancellation at the higher frequencies is desired. This ability of FIG. 3 to cancel noise signals of higher frequency results from the acoustic decoupling of spring 33 from element 28 by its physical separation therefrom and the slight acoustic isolation afforded by outer sheath 17.

Likewise, the choice of circuitry to cancel the signals from the individual transducer pairs at the elements themselves, as illustrated in FIG. 2, or at the utilization device, as illustrated in FIG. 3, depends on such factors as cost effectiveness and the particular utilization device. That is, the structure shown in FIG. 3 permits some control of individual gain, phasing, and time delay to permit more optimum noise cancellation where such sophisticated equipment is available. However, these advantages are offset somewhat by the increased cable complexity occasioned by the additional wiring of independent output cables. Since such cost analysis is dependent upon the particular application, and well within the purview of those skilled in the art, further description thereof is deemed unnecessary.

It should be noted, that the invention is also subject to certain other modifications within the normal scope of persons skilled in the electroacoustic arts. For example, each transducer element may comprise more than a single pair of elements and any even number arrangement may be used. Also, rather than being linearly disposed the cylindrical transducer elements comprising each transducer pair may be broken into component segments. For example, the active transducer may be broken into two segments, one placed on either side of the dummy transducer. Such an arrangement gains an advantage in uniformity in the external field to which the transducer element is exposed at the expense of mechanical and electrical complexity.

The foregoing description taken together with the appended claims constitute a disclosure such as to enable a person skilled in the electroacoustic and instrumentation arts and having the benefit of the teachings contained therein to make and use the invention. Further, the structure herein described meets the objects of invention, and generally constitutes a meritorious advance in the art unobvious to such a worker not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. An electroacoustic transducer comprising:
   an elongated acoustically transparent conduit;
   a plurality of transducer elements spaced at predetermined intervals along the interior of said conduit and connected in circuit to provide a desired electroacoustic response pattern;
   a plurality of dummy electroacoustic transducer elements each identical to and spaced closely adjacent to one of said transducer elements in such a manner as to be in the same acoustical environment and connected in circuit arrangement to cancel signals produced in the adjacent transducer element when both the transducer element and the dummy transducer element receive the same acoustic energy; and
   acoustic isolation means effectively disposed with respect to said dummy element to prevent acoustic energy originating outside said elongated conduit from impinging said dummy element.

2. An electroacoustic transducer according to claim 1 wherein said transducer elements and said dummy transducer elements are cylindrically shaped piezoelectric assemblies.

3. An electroacoustic transducer according to claim 2 wherein the piezoelectric assemblies are made of barium titanate.

4. An electroacoustic transducer according to claim 2 wherein said acoustic isolation means comprises a metallic member disposed concentrically about said dummy element.

5. An electroacoustic transducer according to claim 4 wherein said metallic member is a length of spiral wound wire.

6. An electroacoustic transducer according to claim 5 wherein the length of spiral wound wire is compressed to bring adjacent windings into physical contact with one another.

7. An electroacoustic transducer according to claim 4 additionally including a fluid filled cell enclosing the transducer element and dummy element pair together with the metallic member and located within the aforesaid elongated acoustically transparent conduit.

8. An electroacoustic transducer according to claim 4 wherein the metallic member is positioned on the outside of said elongated acoustically transparent conduit.

9. An electroacoustic transducer according to claim 8 wherein the metallic member is a length of spiral wound wire.

10. An electroacoustic transducer according to claim 9 wherein said length of spiral wound wire is secured to the aforesaid elongated acoustically transparent conduit by means of an encapsulating plastic cement.

* * * * *